United States Patent Office 3,565,700
Patented Feb. 23, 1971

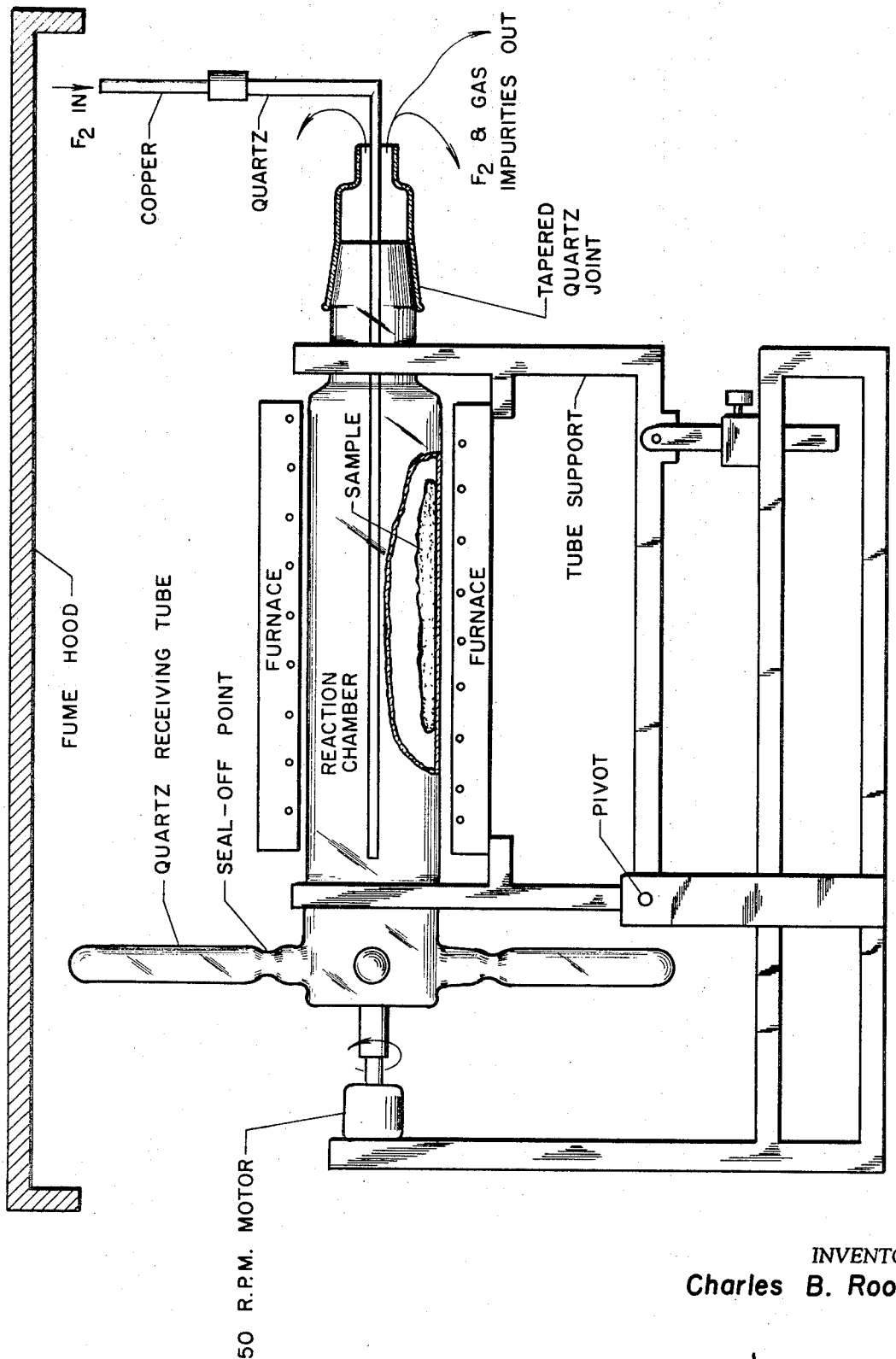

---

3,565,700
METHOD FOR PREPARING AND PURIFYING PURE DRY FLUORIDE MATERIALS
Charles B. Root, Silver Spring, Md., assignor to the United States of America as represented by the Secretary of the Navy
Filed Dec. 10, 1968, Ser. No. 782,546
Int. Cl. C01d *3/02;* C01f *11/22*
U.S. Cl. 148—26    2 Claims

ABSTRACT OF THE DISCLOSURE

Methods for preparing and purifying alkali metal and alkaline earth metal salt compounds and mixtures thereof which involve the mixing and treatment of the material in a quartz reaction vessel with fluorine gas at an elevated temperature.

BACKGROUND OF THE INVENTION

This invention relates to the preparation and purification of alkali metal and alkaline earth metal fluoride compounds, and mixtures thereof.

Alkali and alkaline earth metal fluorides and mixtures thereof are extensively employed as reaction media in the form of molten solvents in various commercial and laboratory processes. These materials are now also being used in electrolytic plating processes of refractory metals and also in the surface treatment of metals. Moreover, the alkali and alkaline earth metal fluoride mixtures are useful as electrolyte materials in thermal batteries.

Since most fluorides of the alkali and alkaline earth metals are highly hydroscopic, it is very difficult to exclude water from these compounds and their mixtures, both during their preparation and prior to their use in the molten state. If, however, water is not completely excluded from these compounds and their mixtures, the following detrimental hydrolysis reactions occur in the molten state:

$$F^- + H_2O \rightarrow HF + OH^- \qquad (I)$$

$$F^- + OH^- \rightarrow HF + O^= \qquad (II)$$

Reactions I and II are undesirable since they yield the contaminating and corrosive hydroxide and oxide ions. Moreover, the production of the highly corrosive and dangerous chemical HF further necessitate the use of expensive and specialty designed equipment and techniques to insure optimum handling conditions, efficiency and safety in the employment of these fluoride materials. Prior methods of purification and preparation of these materials have not been entirely satisfactory. Basically these prior methods involve the passage of HF gas through the molten fluoride material thus reversing Reactions I and II and liberating water from the system. However, due to the corrosive nature of the HF gas and the fluoride melt, these procedures must take place in nickel vessels and consequently make possible the introduction of nickel impurities into the final products via the following reaction:

To prevent this introduction of nickel into the final products, $H_2$ gas is usually simultaneously passed, with the HF gas, through the molten material via the following reactions:

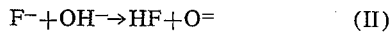

The apparatus for this process is costly and difficult to construct and maintain, while the preparation process is lengthy and tedious.

SUMMARY OF THE INVENTION

It is, therefore, an object of this invention to provide a new and improved method for purifying alkali and alkaline earth metal fluoride compounds and preparing and purifying alkali and alkaline earth metal fluoride compound mixtures.

It is a further object of this invention to provide a new and improved method for purifying alkali and alkaline earth metal fluoride compounds and preparing and purifying alkali and alkaline earth metal fluoride mixtures which is less expensive, simpler and less time consuming then existing methods.

It is still a further object of this invention to provide a new and improved method for purifying alkali and alkaline earth metal fluoride compounds and perparing and purifying alkali and alkaline earth metal fluoride compound mixtures which produces products that do not contain any nickel and are generally of a higher purity than the products of the existing methods.

These and other objects are accomplished by a process involving passing fluorine gas at an elevated temperature through the alkali and alkaline earth fluoride materials in a refractory oxide material rotating chamber and removing the final product without exposure to the air.

BRIEF DESCRIPTION OF THE DRAWING

The sole figure is a perspective view of the apparatus used in the practice of the method of this invention.

DESCRIPTION OF THE PREFERRED EMBODIMENTS

In one embodiment of this invention mixed alkali metal fluoride, mixed alkaline earth metal fluoride or mixed alkali metal-alkaline earth metal fluoride materials are prepared and purified by exposing the proper ratio of fluoride materials in a heated rotating reaction chamber to fluorine gas. The exposure time and temperature of the chamber may vary from about 1 to 8 hours and 100–300° C., respectively, but are preferably about 1 to 2 hours and about 200° C., respectively. The fluorine flow through the chamber may be from about 25 cc./min. to about 50 cc./min. Usually, however, 25 cc./min. is preferred. Although, the reaction chamber may be constructed of any refractory oxide material which is stable in the presence of fluorine gas at the particular temperature of the reaction, the preferred materials are quartz and Alundum ($Al_2O_3$). After this exposure of the matrials to the fluorine gas, all the water and organic impurities, as well as oxides, have been converted to volatile fluoride compounds and are exhausted from the reaction chamber. The fluoride mixtures may, at this point, and after terminating the flow of fluorine gas, be removed from the reaction chamber but without exposure to the air. However, it is preferred, in order to further insure the mixtures from added impurities, to replace the fluorine gas with a dry inert gas, such as for example, argon or nitrogen, and raise the temperature of the reaction chamber to the melting point of the mixture. The melt is then removed from the chamber, again without exposure to the air, and permitted to solidify in sealed containers. The melting and solidifying process is advantageous in that it converts the fluoride mixtures from their original powder form, which is extremely susceptible to picking up water impurities, to a lump form which is not. Obviously, nickel cannot be introduced into the mixtures by the present method since nickel is not employed anywhere in the process.

Any alkali and alkaline earth metal fluoride mixtures may be prepared and purified by the method of this invention. For example, some of these mixtures are LiF-NaF-KF eutectic (FLINAK) (M.P. 458° C.) containing 46.5 mole percent LiF, 42 mole percent KF and remainder NaF, KF-NaF eutectic (M.P. 700° C.) containing 59.5 mole percent KF, remainder NaF, CaF$_2$-KF-LiF eutectic (M.P. 490° C.) containing 2.3 mole percent CaF$_2$, 48.6 mole percent KF and 49.1 mole percent LiF, KF-LiF eutectic (M.P. 475° C.) containing 50 mole percent KF and 50 mole percent LiF, and others such as CsF-KF.

In another embodiment of this invention alkali metal and alkaline earth metal fluoride compounds are purified employing the same method hereinbefore described for the preparation and purification of the fluoride mixtures, except by substituting these materials in their place. Some fluoride compounds which are purified by the method of the present invention are NaF, KF, CaF$_2$, LiF and CsF.

The general nature of the invention having been set forth, the following example is presented as a specific illustration thereof. It will be understood that the invention is not limited to this example but is susceptible to various modifications that will be recognized by one of ordinary skill in the art.

EXAMPLE

An eutectic mixture of LiF-KF-NaF was prepared by placing about 23 grams of powdered LiF, about 21 grams of powdered KF and about 6 grams NaF in the reaction chamber of the apparatus as shown in the solitary view. The reaction chamber was rotated and the fluoride mixture was exposed to a flow of fluorine gas (about 25 cc./min.) at a temperature of about 200° C. After exposure to the fluorine gas for approximately one hour all the water and other volatile impurities were released from the reaction chamber, via a conventional tapered quartz joint and exhausted by a high velocity fume hood in which the entire apparatus operates. The fluorine flow through the apparatus was then replaced by dry argon gas and the temperature was raised to the melting point of the eutectic mixture, approximately 450° C. The tumbling action of the reaction chamber was stopped as soon as the eutectic began to melt. After melting, the apparatus was tilted so that the molten eutectic filled each of the receiving tubes and was allowed to solidify there. The receiving tubes were then sealed off. When tested the eutectic fluoride mixture showed no signs of impurities.

As will be evident to those skilled in the art, various modifications can be made in light of the foregoing disclosure without departing from the scope and spirit thereof.

What is claimed and described to be secured by Letters Patent of the United States is:

1. A method for preparing and purifying a metal fluoride salt mixture which comprises placing the ingredients of a metal fluoride eutectic salt mixture selected from the group consisting of LiF-KF-NaF, KF-NaF, CaF$_2$-KF-LiF, KF-LiF and CsF-KF in a reaction chamber constructed of a refractory oxide material selected from the group consisting of quartz and Alundum (Al$_2$O$_3$), simultaneously mixing and exposing said metal fluoride salt mixture to fluorine gas at an elevated temperature within the range of from about 100° C. to 300° C., by rotating said reaction chamber for a sufficient time to free said metal fluoride salt mixture from contaminant water, oxides and other volatile impurities and thereafter removing the purified metal fluoride salt mixture from the reaction chamber without any exposure to the air.

2. The process of claim 1 wherein said metal fluoride salt mixture is LiF-KF-NaF.

References Cited

UNITED STATES PATENTS

| | | | |
|---|---|---|---|
| 1,914,425 | 6/1933 | Henglein et al. | 23—88X |
| 2,550,173 | 4/1951 | Swinehart et al. | 23—88 |
| 2,887,357 | 5/1959 | Seaborg et al. | 23—88X |
| 2,982,053 | 5/1961 | Elmer | 49—79 |
| 3,114,601 | 12/1963 | Letter | 23—88 |

EDWARD STERN, Primary Examiner

U.S. Cl. X.R.

23—88; 252—364